United States Patent [19]
Muller et al.

[11] 3,831,718
[45] Aug. 27, 1974

[54] PARKING BRAKE ASSEMBLY FOR TRACK-TYPE VEHICLES

[75] Inventors: Thomas P. Muller, Aurora; Ellis A. Sitton, East Peoria, both of Ill.

[73] Assignee: Caterpillar Tractor Co., Peoria, Ill.

[22] Filed: Nov. 24, 1972

[21] Appl. No.: 309,283

[52] U.S. Cl. ............................. 188/170, 188/72.1
[51] Int. Cl. ............................................ F16d 65/24
[58] Field of Search .................. 188/170, 366, 72.1; 192/91 A; 92/169; 287/DIG. 7; 403/315, 377

[56] References Cited
UNITED STATES PATENTS

| | | | |
|---|---|---|---|
| 2,994,393 | 8/1961 | Whaley | 188/170 X |
| 3,212,613 | 10/1965 | Carlson | 192/91 A X |
| 3,536,230 | 10/1970 | Williams | 188/170 X |
| 3,680,666 | 8/1972 | Summer | 188/170 |
| 3,688,877 | 9/1972 | Day | 188/170 X |

Primary Examiner—Lloyd L. King
Assistant Examiner—Randolph A. Reese
Attorney, Agent, or Firm—Phillips, Moore, Weissenberger, Lempio & Strabala

[57] ABSTRACT

The final drive for a track-type vehicle comprises a speed reduction gear train operatively connectible to a hydrostatic drive motor to drive a track engaging sprocket. A parking brake assembly is mounted between the motor and gear train and comprises a piston adapted to disengage the brake by directly engaging a snap ring mounted in an annular groove formed on a reciprocal hub. The hub has a pressure plate secured thereon which, in turn, releases spring-biased friction discs upon disengagement of the brake. A radially disposed end plate is attached to the piston to abut an end of the hub to prevent dislodgement of the snap ring.

11 Claims, 3 Drawing Figures

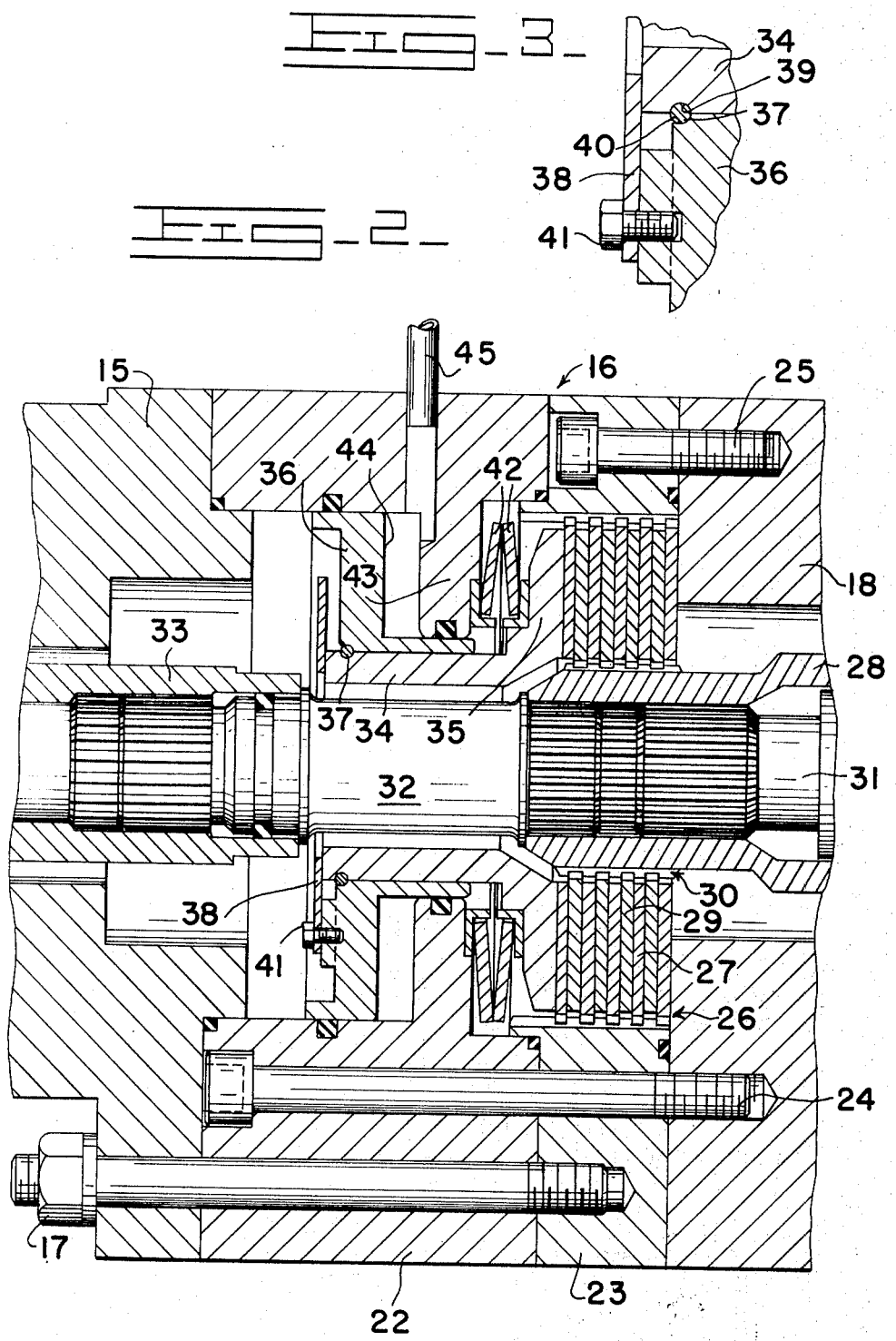

PARKING BRAKE ASSEMBLY FOR TRACK-TYPE VEHICLES

BACKGROUND OF THE INVENTION

Conventional track-type vehicles, such as hydraulic excavators, oftentimes employ a pair of final track drives, each driven by a hydrostatic motor. During a parking or working mode of excavator operation, the tracks are normally locked against movement by a suitably integrated parking brake. Servicing of the parking brake usually requires the complete disassembly of the drive train and attendant support structures and the use of special tooling therefor. In addition, working components for such parking brakes are oftentimes complex and expensive to manufacture.

SUMMARY AND OBJECTS OF THE INVENTION

An object of this invention is to overcome the above, briefly described problems by providing a non-complex and economical drive establishing device, such as a parking brake assembly, adapted for expeditious assembly and disassembly to facilitate servicing or replacement of its individual components.

The device comprises friction disc means, a reciprocal hub having a pressure plate thereon, adapted to selectively compress the friction disc means, a piston reciprocally mounted on the hub, positioning means for axially positioning the piston and hub and drive transmitting means detachably mounted on the hub to be engaged by the piston to move the hub.

In the preferred embodiment of this invention, the drive transmitting means comprises a snap ring and the positioning means comprises an annular end plate attached to the piston to engage an end of the hub to prevent dislodgement of the snap ring. The device finds particular application as a parking brake assembly in the final drive of a track-type vehicle.

BRIEF DESCRIPTION OF THE DRAWINGS

Other objects of this invention will become apparent from the following description and drawings wherein:

FIG. 2 is an enlarged sectional view of the parking brake assembly, taken in the direction of arrows II—II in FIG. 1; and FIG. 3 is an enlarged fragmentary view of certain elements of the brake assembly.

DETAILED DESCRIPTION

Figure 1:
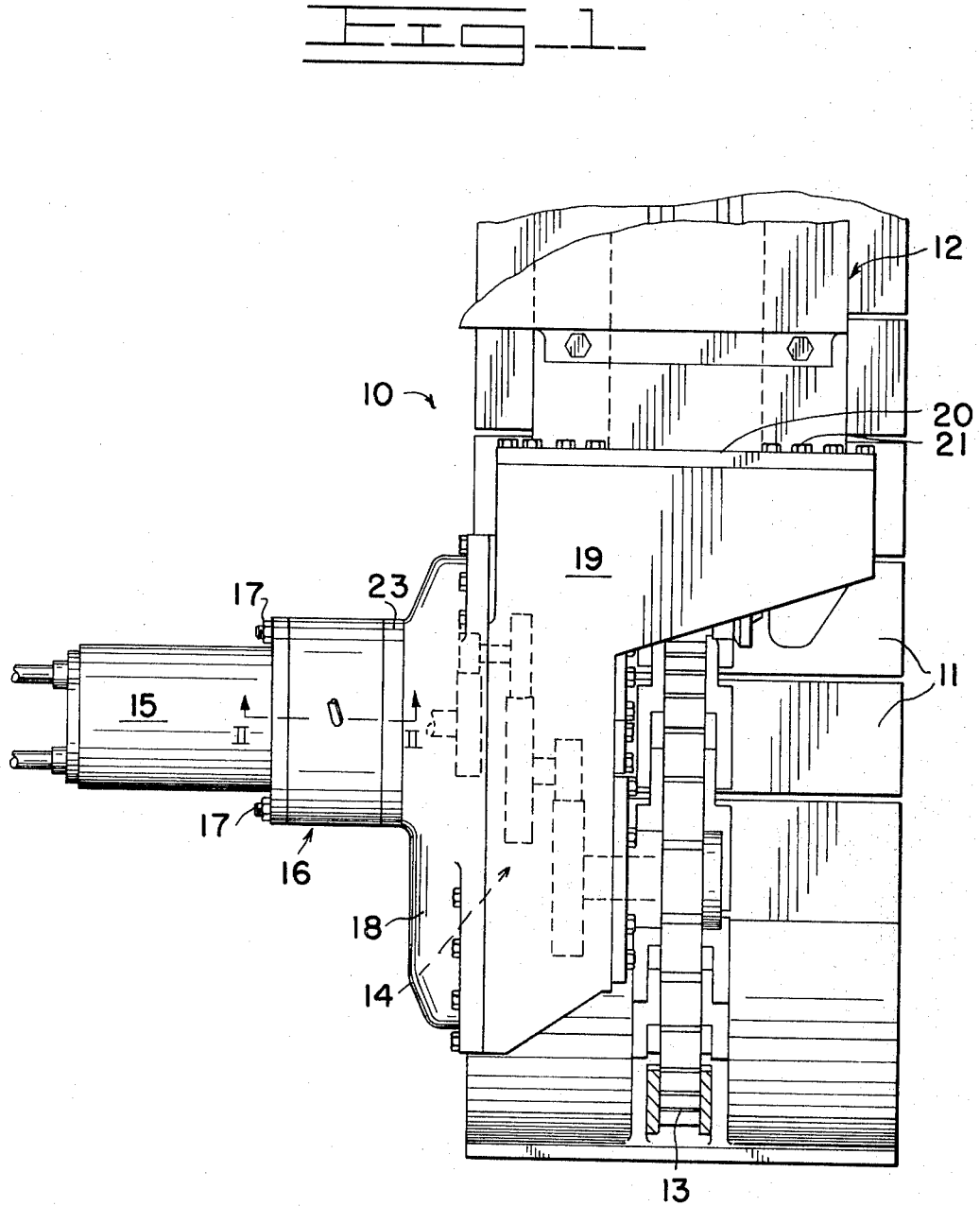
FIG. 1 is a partial top plan view of a final drive for a track-type vehicle, incorporating a parking brake assembly embodiment of this invention therein, with a top portion of an endless track assembly removed therefrom for clarification purposes.

Referring to FIG. 1, a partially illustrated mobile undercarriage 10 of a track-type vehicle, such as a hydraulic excavator, comprises a pair of laterally spaced and parallel endless track assemblies 11 (one shown). Each track assembly is suitably mounted on a track frame 12 to be driven by a drive sprocket 13 via a transmission 14 and motor means, such as a hydrostatic motor 15. The transmission, motor means and associated track assembly are duplicated on the opposite side of the undercarriage.

A parking brake assembly 16 of this invention detachably mounts the housing of motor 15 thereon by circumferentially disposed bolts 17 and is, in turn, detachably mounted on a multi-part housing 18 of the transmission by means hereinafter described. The transmission housing is detachably mounted at a forwardly disposed mounting bracket 19 thereof to a flange 20 of track frame 12, solely by a plurality of bolts 21. Although such parking brake assembly is herein described in association with the partially illustrated endless track-type vehicle, it should be understood that various novel constructions employed in the assembly will find numerous other brake or clutch applications.

Referring to FIG. 2, the parking brake assembly has a tubular housing comprising annular members 22 and 23 attached to and structurally integrated with the housing of motor means 15 by bolts 17. Circumferentially disposed bolts 24 releasably attach members 22 and 23 to structurally integrated transmission housing 18 whereas additional bolts 25 also attach member 23 to such housing. A first spline connection 26 mounts a first group of annular friction discs 27 for axial movement on member 23.

An elongated sleeve 28 has a second group of annular friction discs 29 mounted thereon for axial movement by a second spline connection 30 to interleave such friction discs with friction discs 27. An output or transmission power shaft 31 is splined internally in the sleeve along with an axially aligned coupling shaft 32. The latter shaft is further splined to an axially aligned and tubular input or motor power shaft 33. As more fully explained hereinafter, the friction discs comprise normally engaged braking means for normally holding sleeve 28 against rotation to prevent input shaft 33 from driving output shaft 31.

The brake assembly further comprises a cylindrical hub 34 having an annular pressure plate 35 integrally formed as a radial flange on a first end thereof. An annular piston 36 is reciprocally mounted on the hub and is held against leftward axial movement thereon by a snap ring 37 and has an annular end plate 38 attached thereto. The snap ring is seated in a circumferential groove 39, formed on the hub, and extends radially outwardly into a counterbore 40 formed in the piston (FIG. 3). The end plate is releasably attached to the piston by cap screws 41, threadably mounted to circumferentially disposed bosses, and abuts a second end of hub 34.

Spring means, preferably comprising back-to-back Belleville spring washers 42, are mounted between pressure plate 35 and an annular stationary wall 43 of the housing to normally compress brake discs or friction disc means 27 and 29 together against an internal wall of transmission housing 18. The brake may be released by selectively communicating pressurized oil to an annular chamber 44 via an inlet 45. The sealed chamber is defined between wall 43 and piston 36 and forms a part of the vehicle's integrated hydraulic control system (not shown).

Such pressurization of the chamber will move the piston leftwardly to engage snap ring 37 which functions as a detachable drive transmitting means, positioned axially between piston 36 and hub 34, to move the hub and pressure plate 35 leftwardly to compress springs 42. Compression of the springs will thus release sleeve 28 to permit input shaft 33 to drive output shaft 31. When the pressurized oil in chamber 44 is exhausted, the spring means will expand automatically to restore the brake to its normally engaged FIG. 2 position by moving pressure plate 35 and piston 36 rightwardly under its biasing force. Simultaneously therewith, the end plate will abut the second end of hub 34 to function as a positioning means for maintaining the piston in a fixed axial position relative to the hub to prevent dislodgement of snap ring 37 from groove 39.

In view of the foregoing, it is readily apparent that the present invention provides an improved parking brake assembly for a vehicle that is readily removable therefrom for servicing or replacement purposes. While the invention has been described with particular reference to the preferred parking brake embodiment, it should be understood that the novel constructions thereof can be utilized in other brake or clutch applications. For example, the brake assembly could be utilized in braking applications other than those incumbent with respect to the selective braking of a final drive transmission for a track-type vehicle. Also, this invention is adapted for use in clutching applications wherein the brake housing and structures attached thereto, for example, are rotatably mounted in a transmission or like device for selective coupling to sleeve 28 through coupling means comprising friction discs 27 and 30.

What is claimed is:

1. A drive establishing device comprising:
   friction disc means mounted in said device and operatively connectable to a power shaft;
   a hub reciprocally mounted in said device and having a pressure plate secured thereto for selectively compressing said friction disc means;
   a piston reciprocally mounted on said hub;
   positioning means for maintaining said piston and said hub in a fixed axial position when said hub is moved axially in a first axial direction; and
   drive transmitting means comprising a snap ring, contactable by both said hub and said piston, and detachably mounted on said hub to be engaged by said piston to move said hub in a second axial direction.

2. The device of claim 1 wherein said drive transmitting means is positioned axially between said piston and said positioning means.

3. The device of claim 1 further comprising spring means engaging said pressure plate to normally compress said pressure plate against said friction disc means.

4. The device of claim 3 further comprising a housing, said friction disc means mounted between said pressure plate and an internal wall of said housing to be compressed thereagainst under the biasing force of said spring means.

5. The device of claim 3 wherein said housing further comprises an annular member detachably mounted to said internal wall and having said friction disc means mounted for axial movements thereon and on said power shaft.

6. The device of claim 5 wherein said housing further comprises another annular member detachably mounted in axial alignment to said first-mentioned annular member and to said internal wall and having said piston and hub reciprocally mounted therein.

7. The device of claim 1 wherein said positioning means comprises an end plate detachably mounted on said piston to engage an end of said hub, opposite to an end of said hub having said pressure plate secured thereto.

8. The device of claim 1 further comprising a second power shaft detachably connected in axial alignment to said first-mentioned power shaft by an intermediate coupling shaft.

9. The device of claim 8 wherein said first-mentioned power shaft constitutes an output shaft to a transmission and said second power shaft constitutes an input shaft from a motor.

10. The device of claim 9 wherein said transmission is operatively connected to a drive sprocket of a final drive for a track-type vehicle.

11. A final drive in combination with a track-type vehicle, said final drive comprising
   a track driving sprocket,
   a transmission having an input shaft drivingly connected to said sprocket,
   a motor means having an output shaft for selectively driving said transmission, and
   a normally engaged parking brake assembly, detachably connected between said motor means and said transmission, comprising
   friction disc means operatively connectible to said output shaft for preventing said output shaft from driving said input shaft,
   a hub mounted for axial movements in said brake assembly and having a pressure plate secured thereto which normally engages said friction disc means,
   spring means engaging said pressure plate to normally move said hub and pressure plate in a first axial direction to compress said friction disc means,
   a piston reciprocally mounted on said hub,
   positioning means releasably attached to said piston and engaging said hub to maintain said piston and said hub in a fixed axial position when said hub is moved in said first axial direction, and
   drive transmitting means detachably mounted on said hub to be engaged by said piston to move said hub in a second axial direction to compress said spring means to disengage said parking brake assembly.

* * * * *